(12) United States Patent
Adams

(10) Patent No.: US 12,409,932 B2
(45) Date of Patent: Sep. 9, 2025

(54) NOSE GEAR SPIN DOWN APPARATUS

(71) Applicant: The Boeing Company, Arlington, VA (US)

(72) Inventor: Joshua P. Adams, Lake Stevens, WA (US)

(73) Assignee: The Boeing Company, Arlington, VA (US)

( * ) Notice: Subject to any disclaimer, the term of this patent is extended or adjusted under 35 U.S.C. 154(b) by 87 days.

(21) Appl. No.: 18/491,653

(22) Filed: Oct. 20, 2023

(65) Prior Publication Data
US 2025/0128809 A1   Apr. 24, 2025

(51) Int. Cl.
*B64C 25/20* (2006.01)

(52) U.S. Cl.
CPC ................................... *B64C 25/20* (2013.01)

(58) Field of Classification Search
CPC ......... B64C 25/10; B64C 25/12; B64C 25/14; B64C 25/18; B64C 25/26; B64C 25/36; B64C 2025/125; B64C 25/20; B64C 25/00; B64C 25/001; B64C 25/34; B64C 25/40; B64C 25/42; F16D 59/00; F16D 59/02; F16D 13/30; F16D 2041/0605; F16D 41/061; F16D 41/07
See application file for complete search history.

(56) References Cited

U.S. PATENT DOCUMENTS

| | | | | |
|---|---|---|---|---|
| 5,205,380 | A * | 4/1993 | Paquet | F16D 55/28 188/170 |
| 8,794,092 | B2 * | 8/2014 | Tizac | B64C 25/405 244/103 S |
| 2014/0263832 | A1 * | 9/2014 | Schmidt | B64C 25/405 244/102 A |
| 2017/0113811 | A1 * | 4/2017 | Cokonaj | B64C 25/10 |
| 2020/0298814 | A1 * | 9/2020 | Kordik | B60T 8/1703 |
| 2021/0253227 | A1 * | 8/2021 | Schmidt | B64C 25/405 |

* cited by examiner

*Primary Examiner* — Joshua J Michener
*Assistant Examiner* — Cindi M Curry
(74) *Attorney, Agent, or Firm* — Yee & Associates, P.C.

(57) ABSTRACT

A nose gear spin down apparatus includes a spin down device and a resistance device. The spin down device is rotatable about a central longitudinal axis. The spin down device rotates about the central longitudinal axis after engagement with a spinning nose gear wheel of an aircraft. The resistance device contacts the spin down device without imparting a resistance to the spin down device. The resistance device imparts the resistance to the spin down device after conditions are met.

20 Claims, 13 Drawing Sheets

NOSE GEAR SPIN DOWN APPARATUS

BACKGROUND INFORMATION

1. Field

The present disclosure relates generally to nose gear wheel stowage. More specifically, the present disclosure relates to a nose gear spin down apparatus for arresting rotation of a nose gear wheel when it is stowed after takeoff.

2. Background

The nose gear wheel of an aircraft after takeoff spins at a significant rate (takeoff speed). A typical solution for stopping rotation of a nose gear wheel of an aircraft after takeoff employs a non-moving brake or metallic cleat mounted in the nose gear bay. After takeoff, the nose gear is retracted into the nose gear bay or wheel well such that the nose gear wheel comes into contact with a cleat. The cleat is stationary and the cleat rubs against the nose gear wheel tire until the wheel's rotation is arrested by friction. The nose gear wheel is arrested within seconds of making contact with the cleat.

A major drawback to the existing solution is that the contact/rubbing between the tire and cleat creates a significant amount of tire debris that accumulates on all surfaces inside the nose gear bay. The accumulation of rubber particles within the nose gear bay reduces the ability to inspect or visibility of structural parts housed within the nose gear bay. Lack of ability to inspect hinders airplane maintenance and can mask the existence of cracks or other damage. The tire debris build up thus requires consistent removal and regular cleaning of the nose gear bay. Also, the tire undergoes additional wear as the rubber of the tire is eroded with each takeoff ultimately reducing the lifecycle of the nose gear tire.

Therefore, it would be desirable to have a method and apparatus that takes into account at least some of the issues discussed above, as well as other possible issues.

SUMMARY

An illustrative embodiment of the present disclosure provides a nose gear spin down apparatus comprising a spin down device and a resistance device. The spin down device is rotatable about a central longitudinal axis. The spin down device rotates about the central longitudinal axis at a first speed after engagement with a spinning nose gear wheel of an aircraft. The spinning nose gear wheel of the aircraft spins at a second speed. The resistance device contacts the spin down device without imparting a resistance to the spin down device. The resistance device imparts the resistance to the spin down device when the first speed of the spin down device matches the second speed of the spinning nose gear wheel of the aircraft.

Another illustrative embodiment of the present disclosure provides nose gear spin down apparatus comprising a tubular casing, a threaded shaft, and a resistance device. The tubular casing includes internal threads. The threaded shaft is positioned within the tubular casing. External threads of the threaded shaft engage the internal threads of the tubular casing. The resistance device is axially aligned with the threaded shaft and the tubular casing, the threaded shaft, and the resistance device all share a central longitudinal axis. Movement of the threaded shaft relative to the tubular casing along the central longitudinal axis or movement of the tubular casing relative to the threaded shaft along the central longitudinal axis engages the resistance device after the threaded shaft or the tubular casing moves through a space.

A further illustrative embodiment of the present disclosure provides a method for slowing rotation of a nose gear wheel of an aircraft after takeoff. The method includes a step of retracting a spinning nose gear wheel of the aircraft to a stowed position in a nose gear bay of the aircraft after takeoff of the aircraft. The method includes another step of engaging the spinning nose gear wheel of the aircraft with a nose gear spin down apparatus mounted in the nose gear bay of the aircraft without imparting a resistance to the spinning nose gear wheel of the aircraft. The method further includes a step of imparting the resistance to the spinning nose gear wheel of the aircraft with a resistance device of the nose gear spin down apparatus after an element of the nose gear spin down apparatus moves through a space between the element of the nose gear spin down apparatus and the resistance device and into contact with the resistance device.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that nose gear wheels of aircraft spin at a high rate of speed just after takeoff and before being retracted into a nose gear bay.

The illustrative embodiments recognize and take into account that there is a need to arrest the spinning nose gear wheel from spinning after takeoff and after stowage.

The illustrative embodiments recognize and take into account that current mechanisms installed on today's aircraft include a stationary cleat that contacts the spinning nose gear wheel once the nose gear wheel is retracted to a stowed position within the nose gear bay.

The illustrative embodiments recognize and take into account that contact between the spinning nose gear wheel and a stationary cleat mounted inside the nose gear bay causes undue wear on the nose gear wheel itself and causes debris accumulation in the nose gear bay inhibiting inspection and maintenance.

Thus, the illustrative embodiments provide a nose gear spin down apparatus that provides a resistance to the spinning nose gear wheel to arrest the spinning nose gear wheel without putting undue wear and tear on the nose gear wheel.

Figure 1:
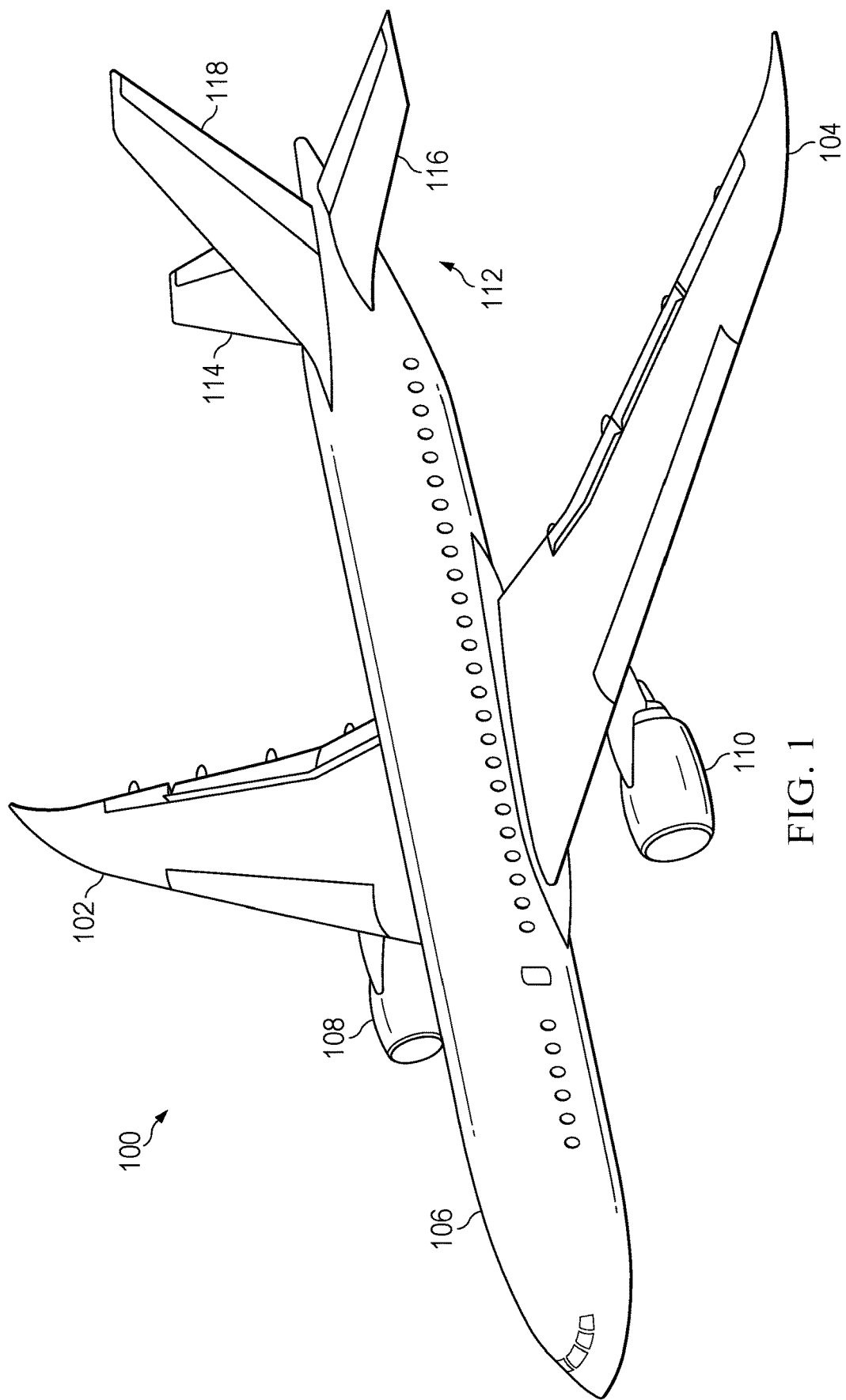
FIG. 1 is an illustration of an aircraft in accordance with an illustrative example.

With reference now to the figures, and in particular, with reference to FIG. 1, an illustration of an aircraft is depicted in accordance with an illustrative example. In this illustrative example, aircraft 100 has wing 102 and wing 104 attached to fuselage 106. Aircraft 100 includes engine 108 attached to wing 102 and engine 110 attached to wing 104.

Fuselage 106 has tail section 112. Horizontal stabilizer 114, horizontal stabilizer 116, and vertical stabilizer 118 are attached to tail section 112 of fuselage 106.

Aircraft 100 is an example of an aircraft in which a nose gear spin down apparatus may be installed in accordance with an illustrative example. For example, a nose gear bay located in fuselage 106 of aircraft 100 may have a nose gear spin down apparatus mounted therein. Nose gear wheels after takeoff spin at a high rate of speed. It is necessary to stop the spinning of the nose gear wheels after they have been retracted into the nose gear bay of the aircraft. A nose gear spin down apparatus as disclosed provides a resistance to the spinning nose gear wheel in order to dissipate rotation of the nose gear wheel without providing undue wear and tear on the nose gear wheel while also alleviating the need for time consuming and costly maintenance/cleaning of the nose gear bay.

The illustration of aircraft 100 in FIG. 1 is not meant to imply physical or architectural limitations to the manner in which an illustrative example may be implemented. For example, although aircraft 100 is a commercial aircraft, aircraft 100 may be a military aircraft, a rotorcraft, a helicopter, an unmanned aerial vehicle, or any other suitable aircraft.

Although the illustrative examples for an illustrative example are described with respect to an aircraft, the illustrative example may be applied to other types of platforms. The platform may be, for example, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where installation of nose gear spin down apparatus is desirable.

Figure 2:
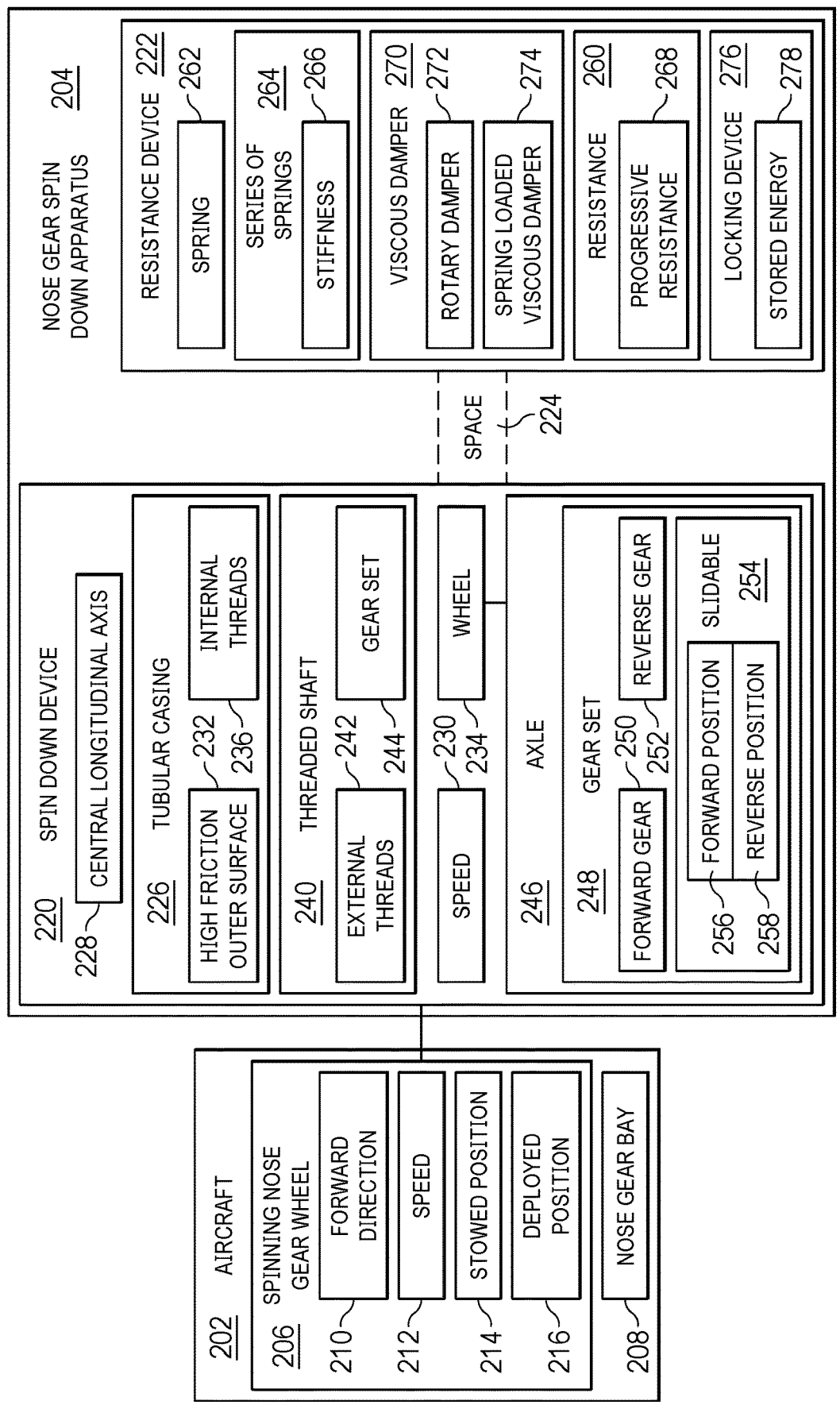
FIG. 2 is an illustration of a block diagram of an nose gear spin down apparatus and an aircraft in accordance with an illustrative embodiment.

Turning now to FIG. 2, an illustration of a block diagram of aircraft 202 and nose gear spin down apparatus 204 is depicted in accordance with an illustrative example.

Aircraft 202 includes spinning nose gear wheel 206 which is retractable and deployable within and from nose gear bay 208. Spinning nose gear wheel 206 spins in forward direction 210 at speed 212. Speed 212 is generally based on or is a function of take off speed of aircraft 202, depending on tire diameter. Once aircraft 202 takes off, spinning nose gear wheel 206 spins at speed 212 in forward direction 210 until the rotation is arrested. Of course, nose gear wheel 206, unless acted on by a cleat or the disclosed nose gear spin down apparatus 204, would eventually stop spinning on its own due to environmental forces that act upon it (e.g., gravity, friction, air resistance). However, it is desirable to arrest the rotation of spinning nose gear wheel 206 promptly to prevent any unnecessary centrifugal forces from spinning nose gear wheel 206 acting on aircraft 202 and to prevent possible damage to the aircraft systems located in the nose gear bay from rotating tire debris should something happen to the tire. If a tire is damaged, then centrifugal forces from a spinning nose gear wheel could eject tire debris.

Spinning nose gear wheel 206 is retractable within and deployable from nose gear bay 208 between stowed position 214 and deployed position 216. When in stowed position 214, spinning nose gear wheel 206 contacts nose gear spin down apparatus 204 mounted in nose gear bay 208. Nose gear spin down apparatus 204 dissipates the rotation energy of spinning nose gear wheel 206 from speed 212 to a stationary state. When in deployed position 216, spinning nose gear wheel 206 is free to rotate without any interference from nose gear spin down apparatus 204.

Nose gear spin down apparatus 204 has spin down device 220 and resistance device 222 in this illustrative example. Spin down device 220 may be spaced from resistance device 222 by space 224.

Spin down device 220 contacts spinning nose gear wheel 206 when spinning nose gear wheel 206 is in stowed position 214 within nose gear bay 208. Of course, it is understood that spinning nose gear wheel 206 will begin slowing and eventually cease spinning once spinning nose gear wheel 206 comes into contact with spin down device 220.

In this illustrative example, spin down device 220 includes tubular casing 226. Tubular casing 226 rotates about central longitudinal axis 228. Tubular casing 226 is urged to rotate about central longitudinal axis 228 from contact with spinning nose gear wheel 206. In other words, the rotation of spinning nose gear wheel 206 causes rotation of tubular casing 226 once spinning nose gear wheel 206 contacts tubular casing 226. Once spinning nose gear wheel 206 contacts tubular casing 226, tubular casing 226 rotates about central longitudinal axis 228 at speed 230. Tubular casing 226 may include high friction outer surface 232 to help gain traction for contact with spinning nose gear wheel 206. High friction outer surface 232 may be a machined surface or an adhesive surface, for example.

Tubular casing 226 may include wheel 234. Wheel 234 may be mounted on tubular casing 226. When wheel 234 is mounted on tubular casing 226, wheel 234 rotates about central longitudinal axis 228. When wheel 234 is mounted on tubular casing 226, wheel 234 contacts spinning nose gear wheel 206 when spinning nose gear wheel 206 is retracted into stowed position 214. When wheel 234 contacts spinning nose gear wheel 206, tubular casing does not necessarily contact spinning nose gear wheel 206. When wheel 234 contacts spinning nose gear wheel 206, wheel 234 rotates about central longitudinal axis 228 at speed 230.

Tubular casing 226 is hollow and further includes internal threads 236.

Spin down device 220 includes threaded shaft 240. Threaded shaft 240 also has central longitudinal axis 228. Threaded shaft 240 is housed within tubular casing 226. Tubular casing 226 and threaded shaft 240 share central longitudinal axis 228. Threaded shaft 240 includes external threads 242. External threads 242 engage internal threads 236 of tubular casing 226. Threaded shaft 240 may also include gear set 244.

Spin down device 220 may also include axle 246. When spin down device 220 includes axle 246, wheel 234 is mounted on axle 246. When spin down device 220 includes axle 246 and wheel 234, axle 246 and wheel 234 rotate at speed 230 when wheel 234 contacts spinning nose gear wheel 206.

Axle 246 includes gear set 248. Gear set 248 includes forward gear 250 and reverse gear 252 mounted on axle 246. Gear set 248 is slidable 254 along axle 246. Gear set 248 is slidable 254 along axle 246 between forward position 256 and reverse position 258.

In this illustrative example, resistance device 222 provides resistance 260 to spin down device 220. Resistance 260 ultimately arrests rotation of spinning nose gear wheel 206 when spinning nose gear wheel 206 is in stowed position 214 in nose gear bay 208. Resistance device 222 provides resistance to an element of spin down device 220 that contacts resistance device 222. For example, upon rotation of tubular casing 226 resulting from contact with spinning nose gear wheel 206, the rotation of tubular casing 226 and the engagement of internal threads 236 with external threads 242 of threaded shaft 240 urges movement of threaded shaft 240 relative to tubular casing 226 such that threaded shaft 240 moves parallel to central longitudinal axis 228 through space 224 and into contact with resistance device 222. Resistance device 222 provides resistance 260 to retard the longitudinal movement of threaded shaft 240. As the longitudinal movement of threaded shaft 240 slows, the engagement of external threads 242 with internal threads 236 of tubular casing 226 slows speed 230 of tubular casing 226. Because tubular casing 226, or wheel 234 mounted to tubular casing 226 of spin down device 220, is in contact with spinning nose gear wheel 206, the slowing of speed 230 of spin down device 220 slows speed 212 of spinning nose gear wheel 206 until spinning nose gear wheel 206 stops spinning.

It is important to note that resistance device 222 imparts no resistance to the spin down device at initial contact between spin down device 220 and spinning nose gear wheel 206. The free unhindered rotation of the spin down device at first contact is to avoid the undue wear on the rubber tire of a spinning nose gear wheel that occurs when spinning nose gear wheel contacts a static cleat. Resistance device 222 imparts no resistance to the spin down device until an element of the spin down device moves through space 224 and contacts resistance device 222 or as speed 230 of spin down device 220 matches speed 212 of spinning nose gear wheel 206.

Resistance device 222 may provide resistance 260 to spin down device 220 via spring 262. Resistance device 222 may provide resistance 260 to spin down device 220 via series of springs 264. Each spring of series of springs 264 may have a different stiffness 266. Spring 262 or series of spring 264 can provide progressive resistance 268 to spin down device 220. Resistance device 222 may provide resistance 260 to spin down device 220 via viscous damper 270. Non-limiting examples of viscous damper 270 include rotary damper 272 and spring loaded viscous damper 274.

When incorporating spring 262 or series of springs 264, resistance device 222 may include locking device 276. As resistance device 222 provides resistance 260 to spin down device 220, spring 262 or series of springs 264 compress. Once rotation of spinning nose gear wheel 206 is stopped, locking device 276 may engage resistance device 222 to maintain spring 262 or series of springs 264 compressed to capture stored energy 278. In an illustrated example, stored energy 278 may be used to spin up a previously stopped nose gear wheel in forward direction 210 before the nose gear wheel is deployed to deployed position 216 in preparation for landing. Spinning the nose gear wheel back up to near takeoff speed will assist in reducing wear and tire on the rubber tire of the nose gear wheel.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 3:
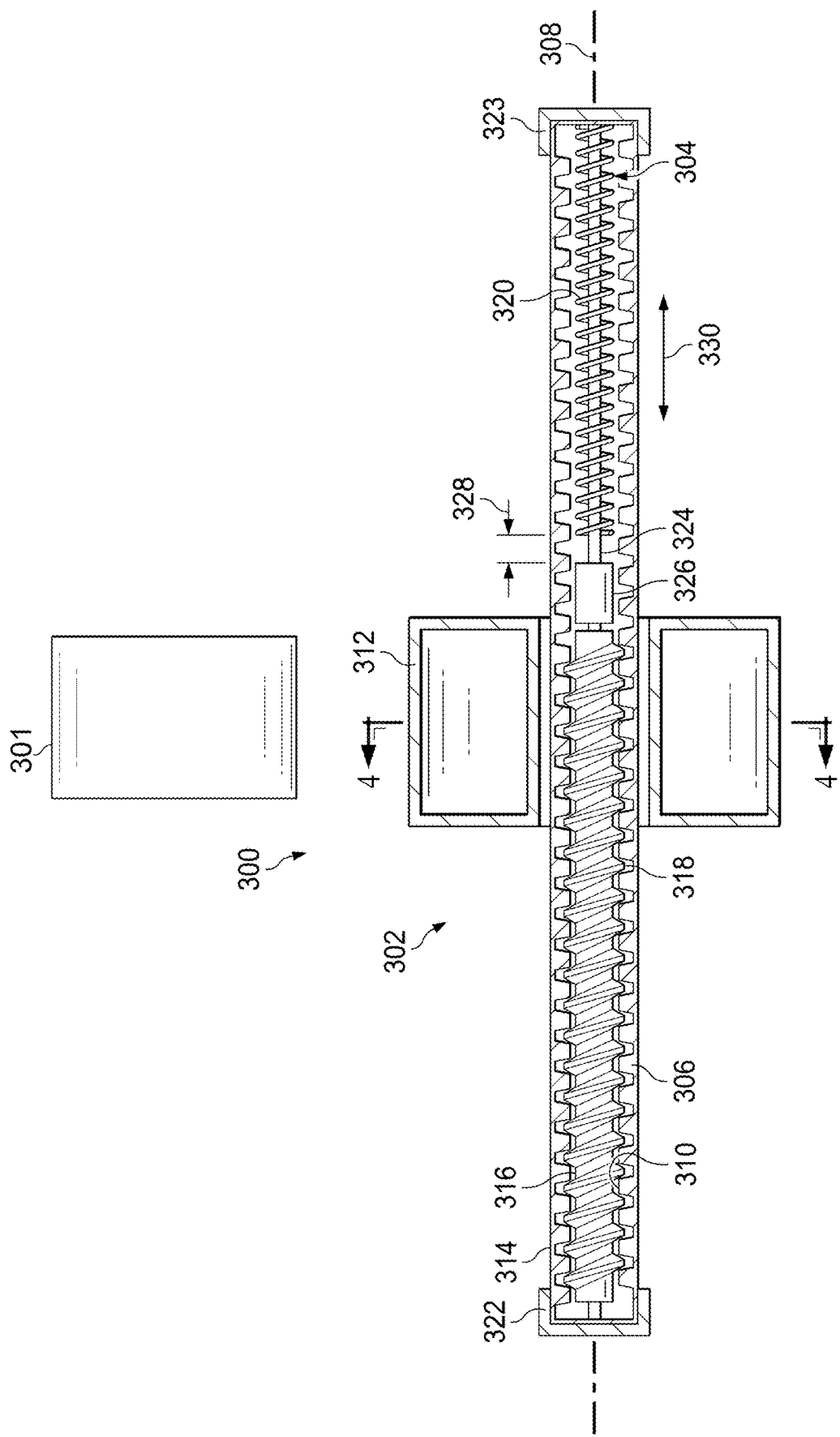
FIG. 3 is an illustration of nose gear spin down apparatus in accordance with an illustrative embodiment.
Figure 4:
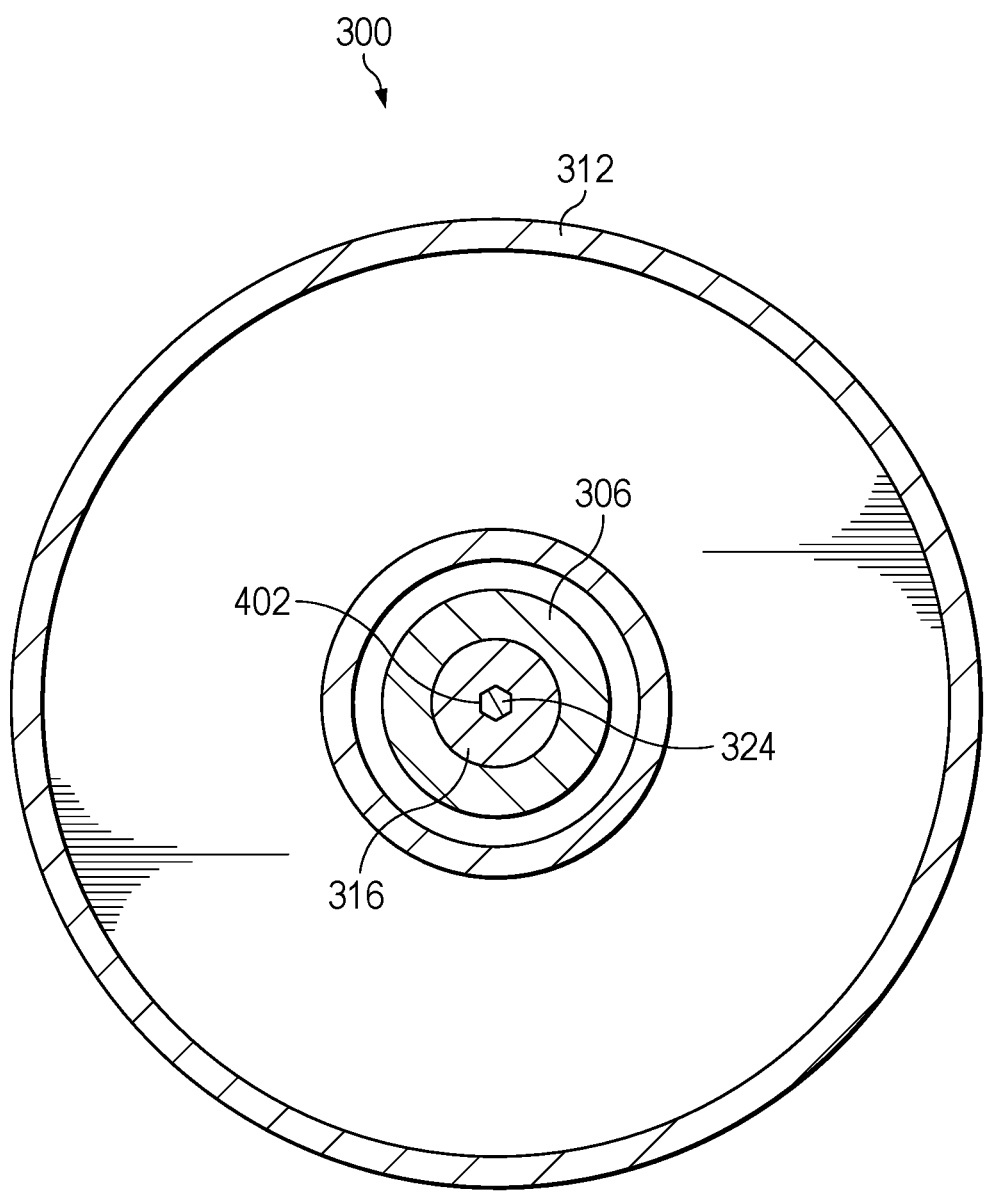
FIG. 4 is an illustration of a cross-section view of a nose gear spin down apparatus in accordance with an illustrative embodiment.
Figure 5:
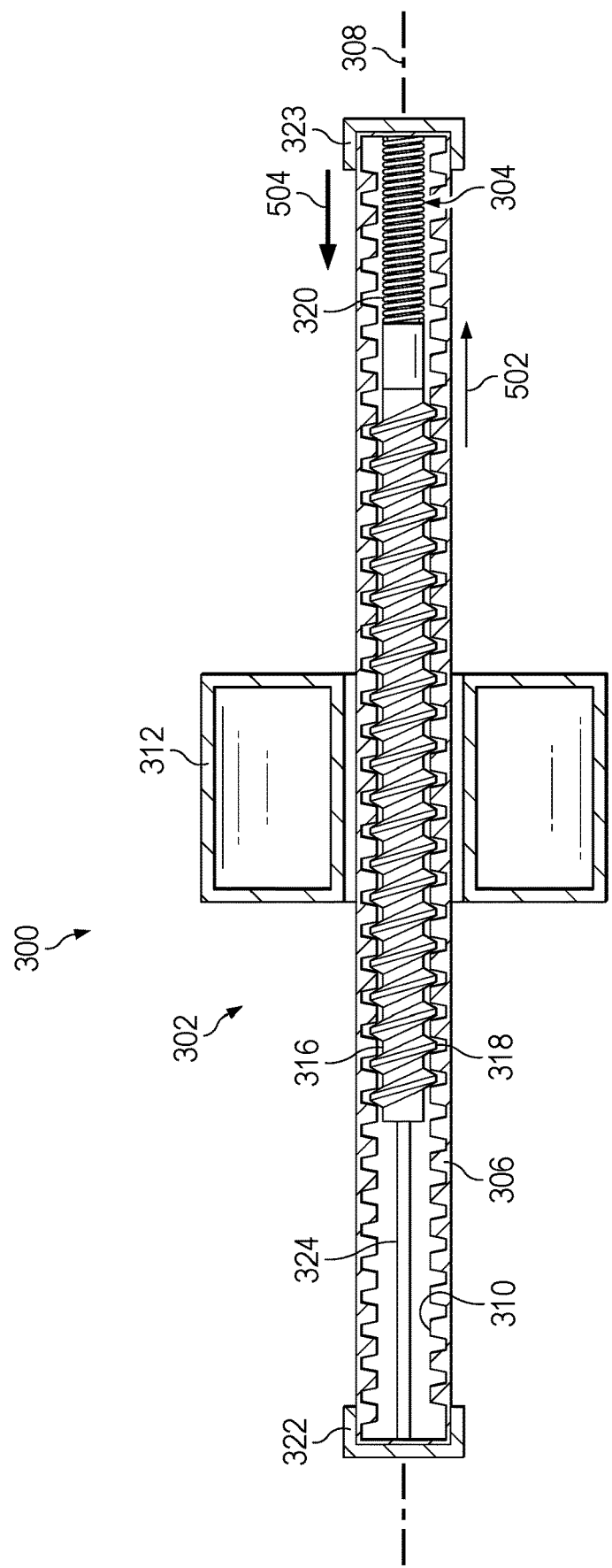
FIG. 5 is an illustration of a nose gear spin down apparatus applying a resistance in accordance with an illustrative embodiment.

With reference next to FIGS. 3-5, illustrations of a nose gear spin down apparatus are depicted in accordance with an illustrative example. In this illustrative example, the components illustrated in FIGS. 3-5 are examples of nose gear spin down apparatus 204 and spinning nose gear wheel 206 shown in block form in FIG. 2.

As depicted, nose gear spin down apparatus 300 has yet to come in contact with spinning nose gear wheel 301. Nose gear spin down apparatus 300 includes spin down device 302 and resistance device 304.

In this illustrative example, spin down device 302 includes tubular casing 306. Tubular casing 306 rotates about central longitudinal axis 308. Tubular casing 306 is hollow and includes internal threads 310. Spin down device 302 includes wheel 312. Wheel 312 is mounted on tubular casing 306. In other words, as wheel 312 rotates, tubular casing 306 rotates at the same rotation speed. Wheel 312 rotates about central longitudinal axis 308. Wheel 312 and tubular casing 306 are urged to rotate about central longitudinal axis 308 from contact with a spinning nose gear wheel at a speed that eventually matches the speed of the spinning nose gear wheel. Wheel 312 contacts a spinning nose gear wheel when a spinning nose gear wheel is retracted into a stowed position within a nose gear bay of an aircraft.

In an alternate example, wheel 312 may not be present. Tubular casing 306 is urged to rotate about central longitudinal axis 308 from direct contact with a spinning nose gear wheel in lieu of wheel 312. High friction surface 314 of tubular casing 306 in contact with a spinning nose gear wheel causes rotation of tubular casing 306. Once a spinning nose gear wheel contacts tubular casing 306, tubular casing 306 rotates about central longitudinal axis 308 at speed that eventually matches the speed of the spinning nose gear wheel. High friction surface 314 may be a machined surface or an adhesive surface, for example.

Spin down device 302 includes threaded shaft 316. Threaded shaft 316 also has central longitudinal axis 308. Threaded shaft 316 includes external threads 318. External threads 318 are sized to engage internal threads 310 of tubular casing 306.

In this illustrative example, resistance device 304 is spring 320. Spring 320 is spaced from threaded shaft 316, or spacer 326 if present, by space 328. It is important to note that prior to spin down device 302 contacting a spinning nose gear wheel, spring 320 is spaced from threaded shaft 316 whether spacer 326 is present or not. In other words, spring 320 does not contact threaded shaft 316 before spin down device contacts a spinning nose gear wheel of an aircraft. When spring 320 is in a resting, non-compressed state, spring 320 is spaced from threaded shaft 316 by at least space 328.

Brackets 322, 323 are used to mount nose gear spin down apparatus 300 to the inside of a nose gear bay. Center rod 324 is connected to and extends between brackets 322, 323. Threaded shaft 316 is slidable in direction 330 along center rod 324. Spring 320 is compressible and expandable in direction 330 along center rod 324. Center rod 324 has non-circular cross-section 402. Non-circular cross-section 402 prevents threaded shaft 316 from rotating about central longitudinal axis 308. Spring 320 is coiled around center rod 324.

In use, nose gear spin down apparatus 300 arrests the rotation of a spinning nose gear wheel of an aircraft when the spinning nose gear wheel is retracted to a stowed position in a nose gear bay of the aircraft after takeoff of the aircraft.

Once retracted into the nose gear bay of the aircraft, the spinning nose gear wheel contacts spin down device 302. The spinning nose gear wheel contacts wheel 312 or contacts tubular casing 306 if wheel 312 is not present. Rotation of the spinning nose gear wheel causes wheel 312 and tubular casing 306 or just tubular casing 306 (if wheel 312 is not present) to rotate about central longitudinal axis 308 in an opposite direction than the rotation of the spinning nose gear wheel. The direction of the spinning nose gear wheel can be considered a forward direction. Rotation of tubular casing 306 and the engagement of internal threads 310 with external threads 318 of threaded shaft 316 causes threaded shaft 316 to translate longitudinally along center rod 324 in direction 502. Translation of threaded shaft 316 in direction 502 causes threaded shaft 316 to move through space 328 and into contact with spring 320. As spring 320 compresses due to the movement of threaded shaft 316, spring 320 provides resistance 504 to slow down the movement of threaded shaft in direction 502. Resistance 504 may be progressive based on the distance threaded shaft translates. Slowing the movement of the threaded shaft in direction 502 causes the rotation speed of tubular casing 306 to slow which ultimately slows and finally stops the spinning nose gear wheel that is in contact with nose gear spin down apparatus 300.

It is important to note that resistance device 304 imparts no resistance to spin down device 302 at initial contact between spin down device 302 and a spinning nose gear wheel. Spring 320 provides no resistance 504 until threaded shaft 316 (or spacer 326, if present) contacts spring 320. An element of spin down device 302, whether that be threaded shaft 316 or spacer 326, must move through space 328 and into contact with spring 320 before spring 320 provides resistance 504. Because spring 320 does not provide resistance immediately, initial contact of the spinning nose gear wheel with the spin down device does not rub the tire of the nose gear wheel and does not cause undue wear on the tire of the nose gear wheel. The speed of the spinning nose gear wheel is matched by the speed of the spin down device before resistance is imparted by the spring on the spin down device.

Figure 6:
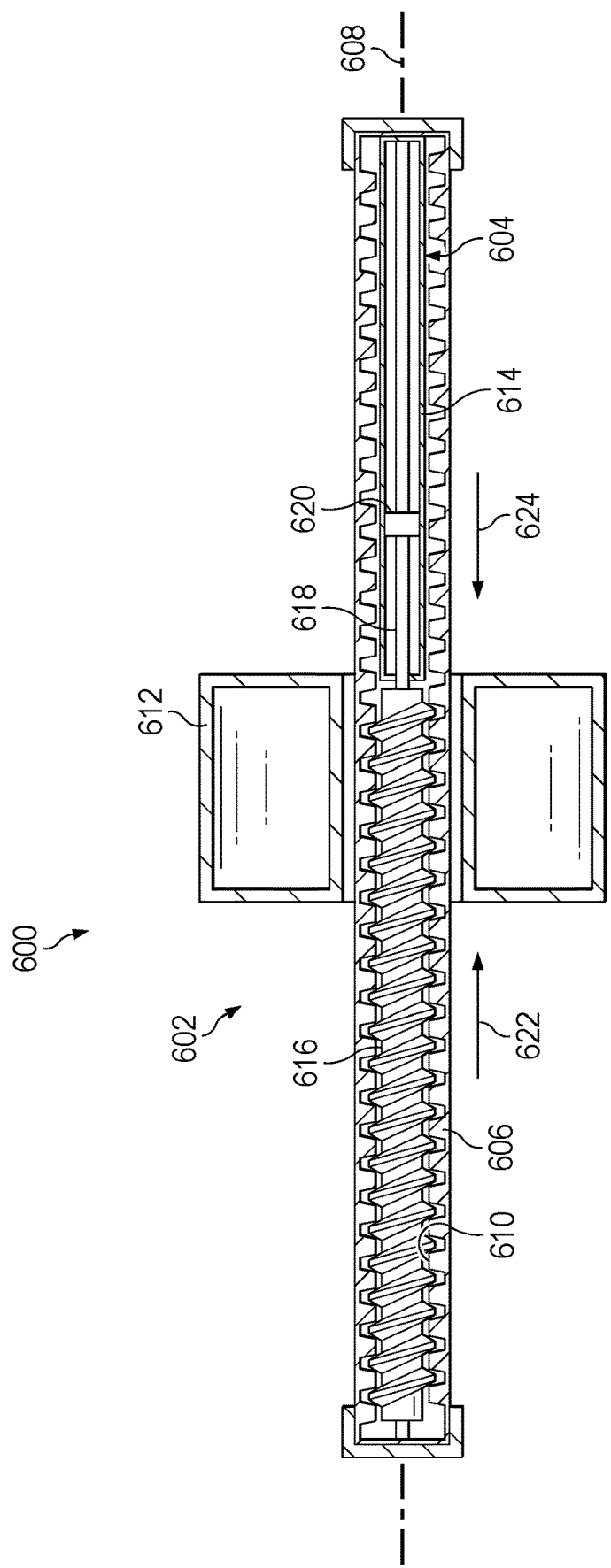
FIG. 6 is an illustration of a nose gear spin down apparatus in accordance with an illustrative embodiment.

With reference next to FIG. 6, illustration of a nose gear spin down apparatus is depicted in accordance with an illustrative example. In this illustrative example, nose gear spin down apparatus 600 is an example of one implementation for nose gear spin down apparatus 204 shown in block form in FIG. 2.

As depicted, nose gear spin down apparatus 600 includes spin down device 602 and resistance device 604.

In this illustrative example, spin down device 602 includes tubular casing 606. Tubular casing 606 rotates about central longitudinal axis 608. Tubular casing 606 is hollow and includes internal threads 610. Spin down device 602 includes wheel 612. Wheel 612 is connected to tubular casing 606. As wheel 612 rotates, tubular casing 606 rotates at the same rotation speed. Wheel 612 rotates about central longitudinal axis 608. Wheel 612 and tubular casing 606 are urged to rotate about central longitudinal axis 608 from contact with a spinning nose gear wheel at a speed that eventually matches the speed of the spinning nose gear wheel. Wheel 612 contacts a spinning nose gear wheel when a spinning nose gear wheel is retracted into a stowed position within a nose gear bay of an aircraft.

In this illustrative example, resistance device 604 is viscous damper 614. In non-limiting examples, viscous damper 614 may be a rotary damper or a spring-loaded viscous damper. When viscous damper 614 is in a resting state, viscous damper 614 provides no resistance to spin down device 602. Threaded shaft 616 is connected to piston rod 618. Piston head 620 is mounted to piston rod 618.

As described previously, rotation of tubular casing 606 causes threaded shaft 616 to translate along central longitudinal axis 608 in direction 622. Threaded shaft 616 moving in direction 622 pushes piston head 620 through the viscous fluid contained within viscous damper 614. Viscous damper 614 provides no resistance 624 to spin down device 602 while piston rod 618 and piston head 620 are at rest within viscous damper 614. After piston head 620 reaches a certain velocity within viscous damper 614, then viscous damper 614 provides resistance 624. Slowing the movement of the threaded shaft in direction 622 causes the rotation speed of tubular casing 606 to slow which ultimately slows and finally stops the spinning nose gear wheel that is in contact with nose gear spin down apparatus 600. In this illustrative example, viscous damper 614 may be a sealed cylinder that returns to a neutral position when unloaded such as a spring loaded viscous damper. In this illustrative example, viscous damper 614 may be a rotary damper that rotates when acted on by threaded shaft 616.

Alternatively, threaded shaft 616 may not be connected to piston rod 618. Thus, threaded shaft 616 is distanced from piston rod by a space. Translation of threaded shaft 616 in direction 622 causes threaded shaft 616 to move through the space between threaded shaft 616 and piston rod 618 and into contact with piston rod 618. Once threaded shaft 616 contacts piston rod 618, viscous damper 614 provides resistance 624 to slow down the movement of threaded shaft 616 in direction 622. Slowing the movement of the threaded shaft in direction 622 causes the speed of rotation of tubular casing 606 to slow which ultimately slows and finally stops the spinning nose gear wheel that is in contact with nose gear spin down apparatus 600.

It is important to note that resistance device 604 imparts no resistance to spin down device 602 at initial contact between spin down device 602 and a spinning nose gear wheel. Viscous damper 614 provides no resistance 624 until piston rod 618 reaches a certain velocity or, alternatively, threaded shaft 616 contacts piston rod 618.

Figure 7:
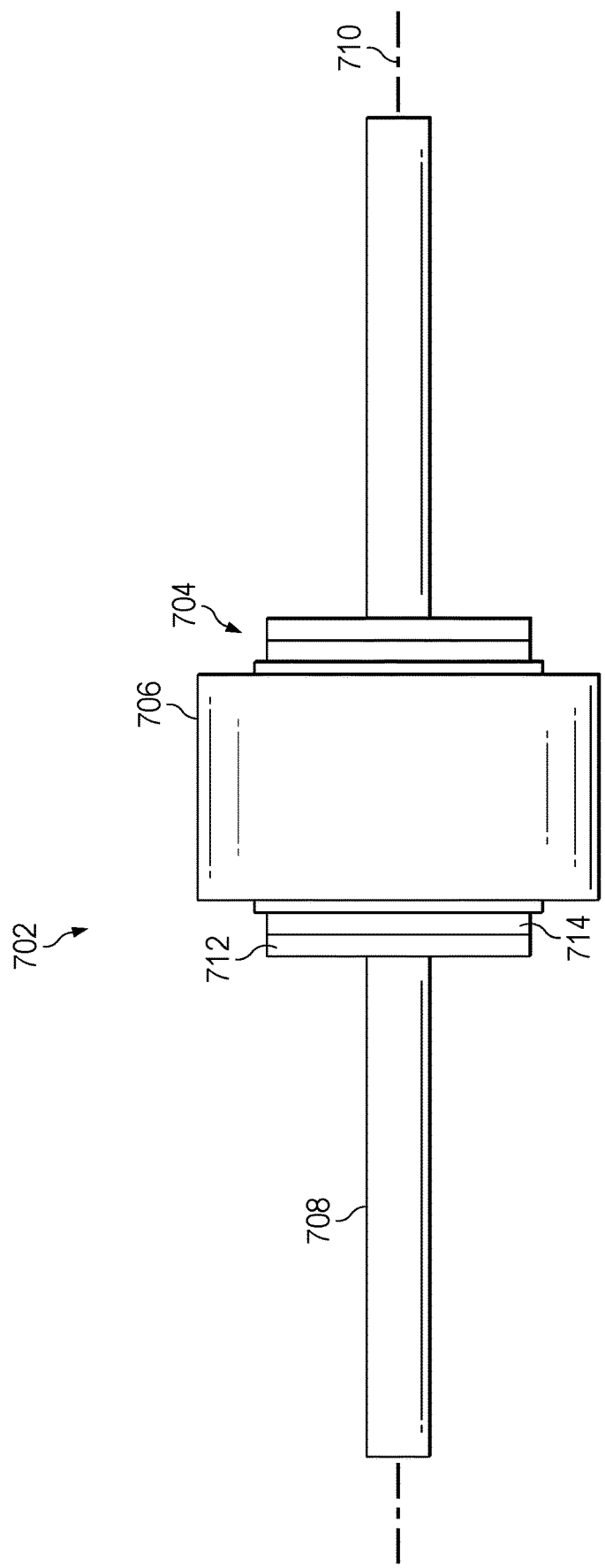
FIG. 7 is an illustration of a nose gear spin down apparatus in accordance with an illustrative embodiment.

With reference next to FIG. 7, illustration of a nose gear spin down apparatus is depicted in accordance with an illustrative example. In this illustrative example, nose gear spin down apparatus 700 is an example of one implementation for nose gear spin down apparatus 204 shown in block form in FIG. 2.

As depicted, nose gear spin down apparatus 700 includes spin down device 702 and resistance device 704.

In this illustrative example, spin down device 702 includes wheel 706 mounted to axle 708. Axle 708 and wheel 706 rotate about central longitudinal axis 710. Resistance device 704 includes brake disc 712 and brake pad 714. Wheel 706 contacts a spinning nose gear wheel when a spinning nose gear wheel is retracted into a stowed position within a nose gear bay of an aircraft. Brake pad 714 pressed against brake disc 712 provides resistance to the rotation of wheel 706 through friction. The friction provided can be a constant friction or a progressive friction based on speed of rotation of the spinning nose gear wheel. Slowing the rotation of wheel 706 ultimately arrests rotation of the spinning nose gear wheel that spin down device is in contact with.

With reference next to FIGS. 8-11, illustrations of a nose gear spin down apparatus are depicted in accordance with an illustrative example. In this illustrative example, the components illustrated in FIGS. 8-11 are examples of nose gear spin down apparatus 204 and spinning nose gear wheel 206 shown in block form in FIG. 2.

As depicted, nose gear spin down apparatus 800 has yet to come in contact with spinning nose gear wheel 801. Nose gear spin down apparatus 800 includes spin down device 802 and resistance device 804.

Spin down device 802 includes wheel 806 mounted to axle 808. Wheel 806 and axle 808 rotate about central longitudinal axis 810. Wheel 806 and axle 808 are urged to rotate about central longitudinal axis 810 from contact with a spinning nose gear wheel at a speed that eventually matches the speed of the spinning nose gear wheel. Wheel 806 contacts a spinning nose gear wheel when a spinning nose gear wheel is retracted into a stowed position within a nose gear bay of an aircraft.

Figure 8:
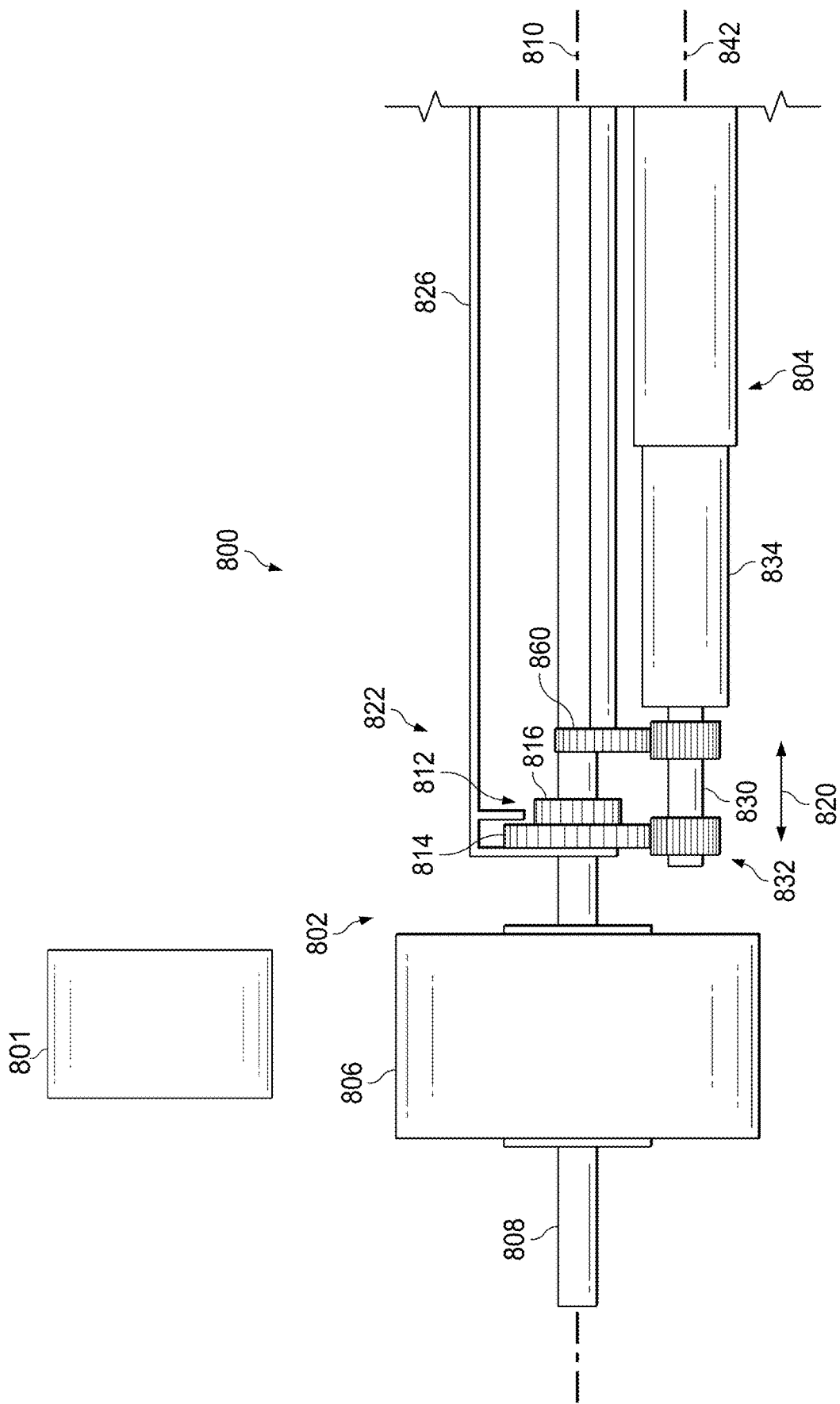
FIG. 8 is an illustration of a nose gear spin down apparatus in accordance with an illustrative embodiment.
Figure 9:
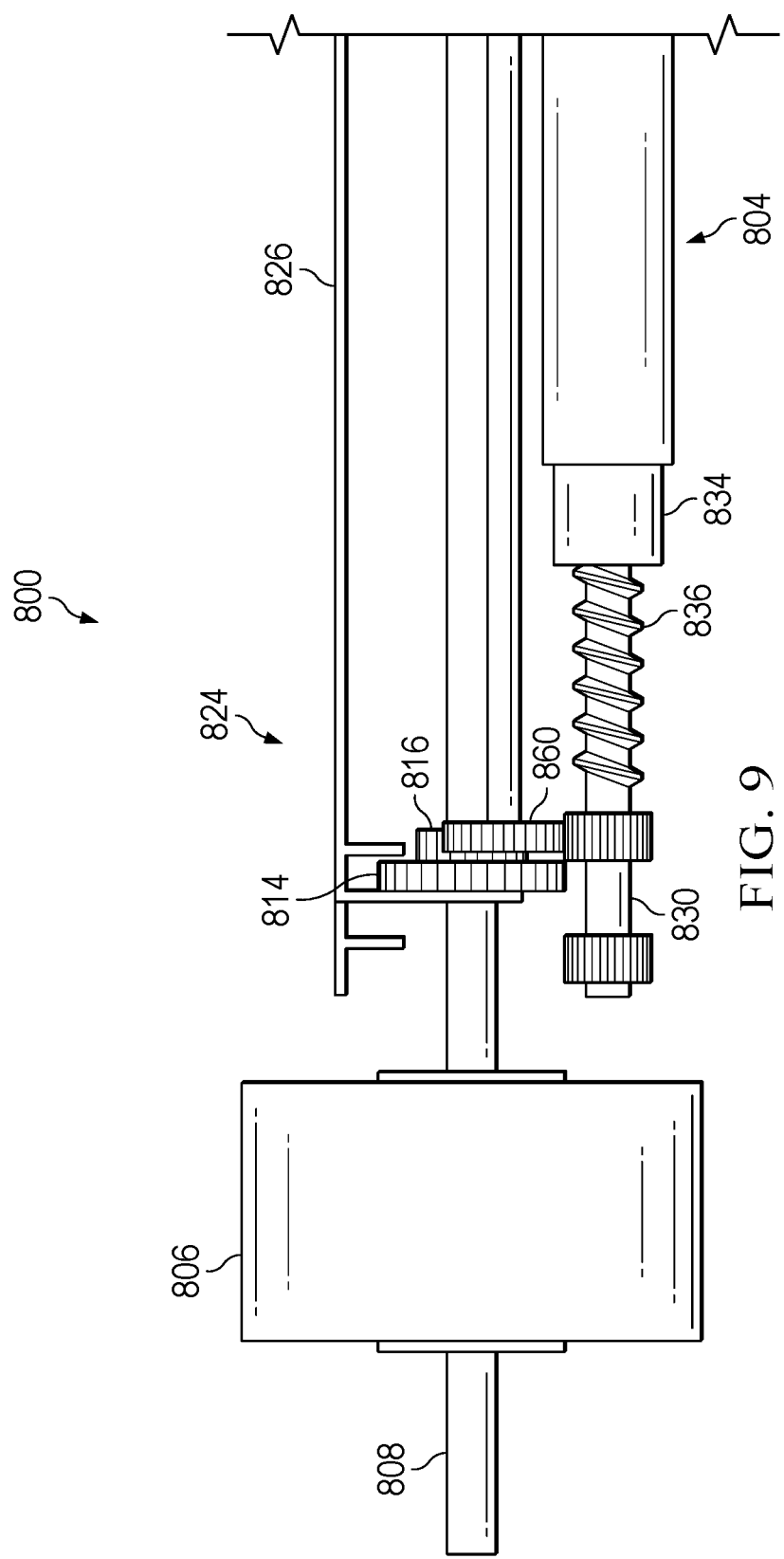
FIG. 9 is an illustration of a nose gear spin down apparatus in accordance with an illustrative embodiment.
Figure 10:
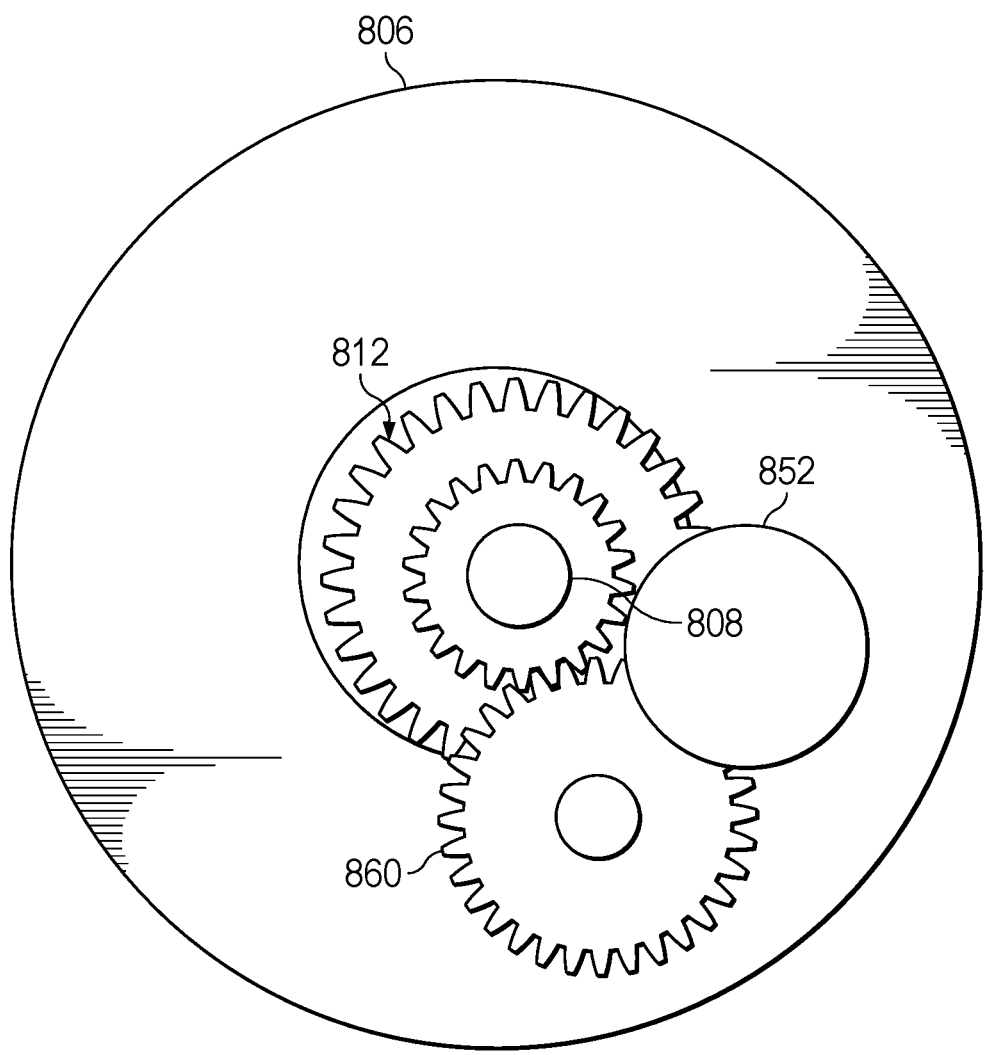
FIG. 10 is an illustration of a side view of a nose gear spin down apparatus in accordance with an illustrative embodiment.
Figure 11:
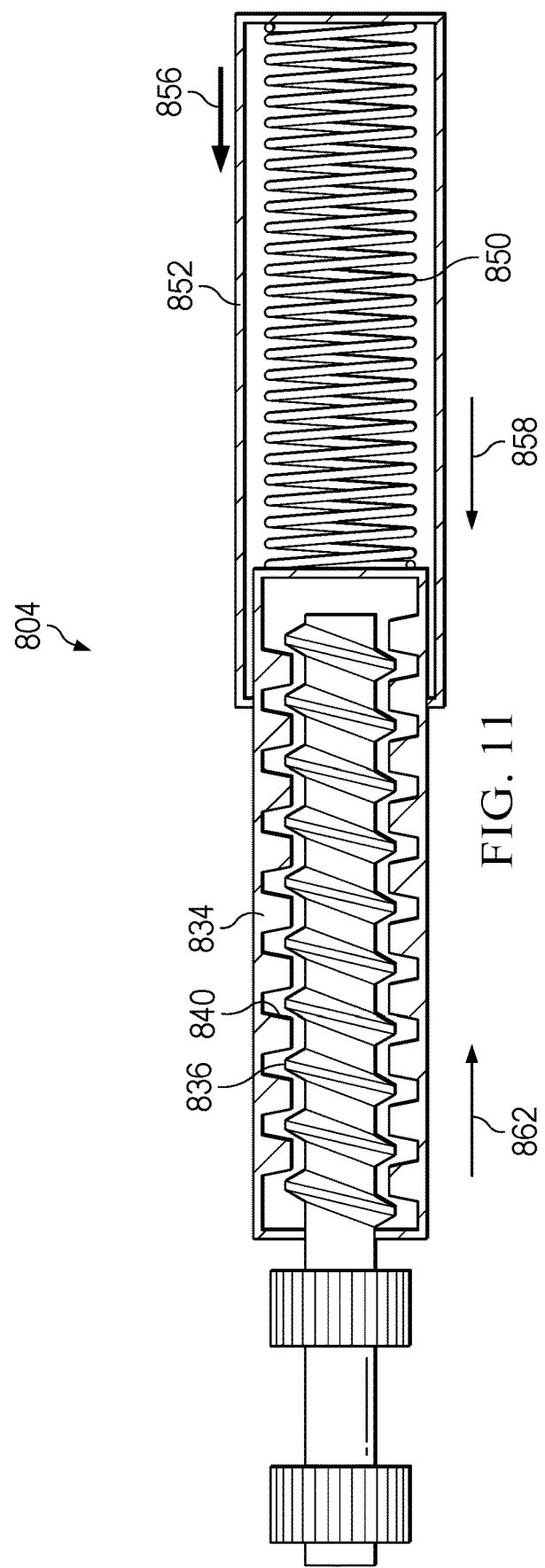
FIG. 11 is an illustration of a nose gear spin down apparatus applying a resistance in accordance with an illustrative embodiment.

Axle 808 includes gear set 812. Gear set 812 includes forward gear 814 and reverse gear 816 mounted on axle 808. Gear set 812 is slidable in direction 820 along axle 808. Gear set 812 is slidable in direction 820 along axle 808 between forward position 822 (as depicted in FIG. 8) and reverse position 824 (as depicted in FIG. 9). Gear shift arm 826 acts on gear set 812 to move gear set 812 between forward position 822 and reverse position 824.

Spin down device 802 includes threaded shaft 830. Threaded shaft 830 includes gear set 832. Threaded shaft 830 is housed within tubular casing 834. Threaded shaft has external threads 836. External threads 836 are sized to engage internal threads 840 of tubular casing 834. Threaded shaft 830 rotates about central longitudinal axis 842.

Resistance device 804 includes spring 850 housed within casing 852. Casing 852 is sized to accept tubular casing 834. Spring 850 provides resistance 856 in direction 858.

Spin down device 802 further includes idler gear 860. When gear set 812 is in forward position 822, forward gear 814 is engaged with gear set 832 of threaded shaft 830. When gear set 812 is in reverse position 824, reverse gear 816 is engaged with idler gear 860 and idler gear 860 is engaged with gear set 832 of threaded shaft 830.

In use, nose gear spin down apparatus 800 arrests the rotation of a spinning nose gear wheel of an aircraft when the spinning nose gear wheel is retracted to a stowed position in a nose gear bay of the aircraft after takeoff of the aircraft.

Once retracted into the nose gear bay of the aircraft, the spinning nose gear wheel contacts spin down device 802. Specifically, the spinning nose gear wheel contacts wheel 806 of spin down device 802. Rotation of the spinning nose gear wheel causes wheel 806 and axle 808 to rotate about central longitudinal axis 810 in an opposite direction than the rotation of the spinning nose gear wheel. The direction of the spinning nose gear wheel can be considered a forward direction.

When gear set 812 is in forward position 822, gear set 812 engaged with gear set 832 of threaded shaft 830 rotates threaded shaft 830 about central longitudinal axis 842 in the same forward direction as the spinning nose gear wheel. Rotation of threaded shaft 830 and the engagement of external threads 836 with internal threads 840 of tubular casing 834 causes tubular casing 834 to move along central longitudinal axis 842 in direction 862. Movement of tubular casing 834 in direction 862 causes tubular casing 834 to contact spring 850. As spring 850 compresses due to the movement of tubular casing 834, spring 850 provides resistance 856 in direction 858 to slow down the movement of tubular casing 834 in direction 862. Slowing the movement of the tubular casing in direction 862 causes the rotation speed of threaded shaft 830 to slow which ultimately slows and finally stops the spinning nose gear wheel that is in contact with nose gear spin down apparatus 800.

With the rotation of the spinning nose gear stopped, a locking mechanism of resistance device 804 retains spring 850 in a compressed state thus storing energy in spring 850 received from the spinning nose gear wheel. Prior to deploying the nose gear wheel from the stowed position to a deployed position in preparation for landing, nose gear spin down apparatus 800 can release the stored energy and spin up the nose gear wheel in a forward direction as the nose gear wheel is deployed. Spinning up the nose gear wheel in the forward direction is beneficial as it further reduces wear on the rubber tire of the nose gear wheel by reducing friction between the nose gear wheel and the landing surface.

To spin up the nose gear wheel, gear shift arm 826 acts on gear set 812 to move gear set 812 from forward position 822 to reverse position 824. When gear set 812 is in reverse position 824, reverse gear 816 is engaged with idler gear 860 and idler gear 860 is engaged with gear set 832 of threaded shaft 830. The locking mechanism releases spring 850 such that spring 850 urges tubular casing 834 in direction 858 which rotates threaded shaft 830, which rotates axle 808 and wheel 806, which ultimately rotates the nose gear wheel in the forward direction.

Figure 12:
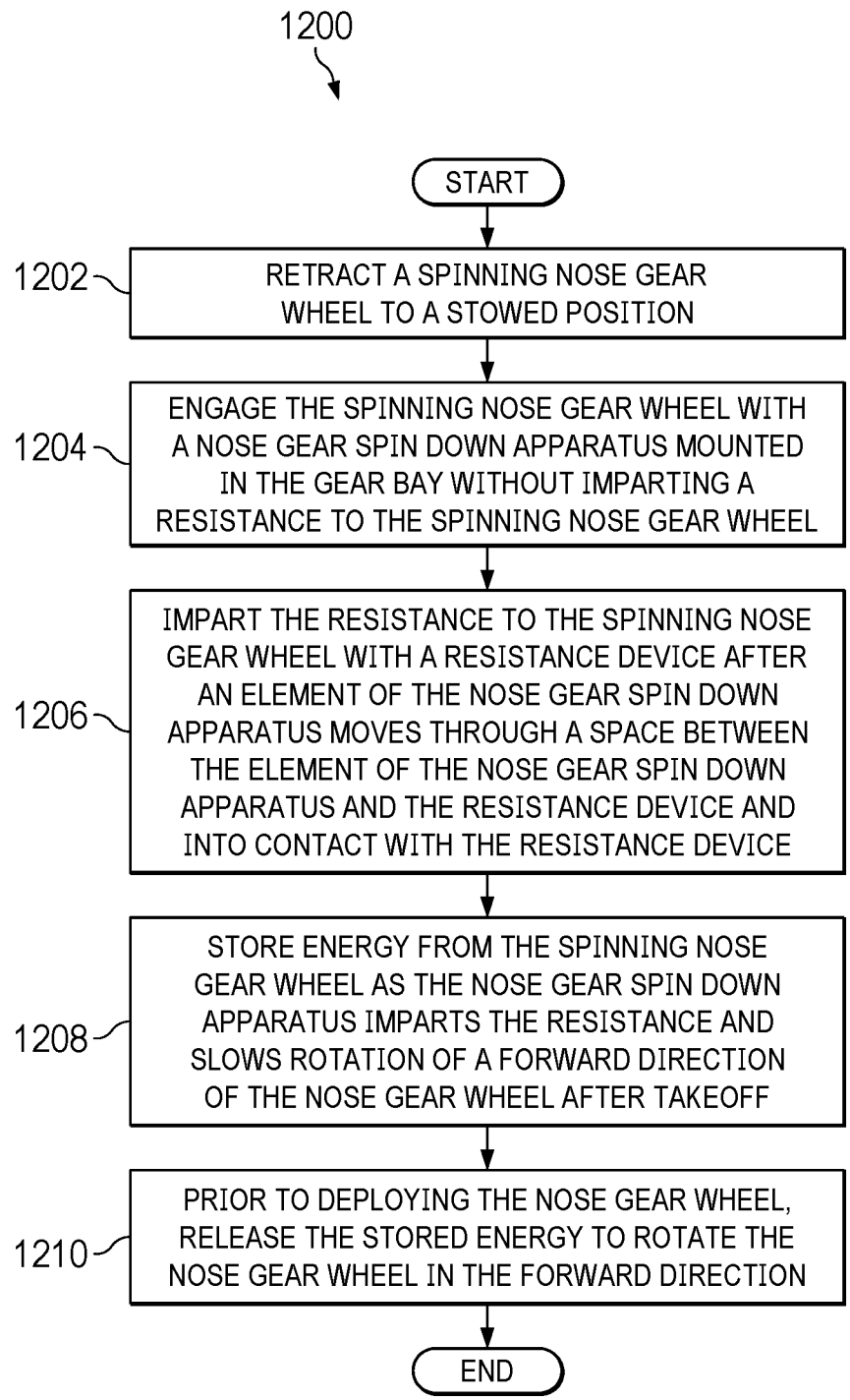
FIG. 12 is an illustration of a flowchart of a process for slowing rotation of a nose gear wheel of an aircraft after takeoff in accordance with an illustrative embodiment.

With reference next to FIG. 12, an illustration of a flowchart of a process 1200 for slowing rotation of a nose gear wheel of an aircraft after takeoff is depicted in accordance with an illustrative example. The method depicted in FIG. 12 may be used in conjunction with nose gear spin down apparatus depicted in FIGS. 1-11.

The process begins by retracting a spinning nose gear wheel of an aircraft to a stowed position in a nose gear bay of the aircraft after takeoff of the aircraft (operation 1202). The process engages the spinning nose gear wheel of the aircraft with a nose gear spin down apparatus. The nose gear spin down apparatus is mounted in the nose gear bay of the aircraft. Initially, the nose gear spin down apparatus does not impart a resistance to the spinning nose gear wheel (operation 1204). The process then imparts the resistance to the spinning nose gear wheel of the aircraft with a resistance device of the nose gear spin down apparatus after an element of the nose gear spin down apparatus moves through a space between the element of the nose gear spin down apparatus and the resistance device and into contact with the resistance device (operation 1206). The process stores energy from the spinning nose gear wheel as the nose gear spin down apparatus imparts the resistance to the spinning nose gear wheel and slows rotation of the nose gear wheel after takeoff (operation 1208). Prior to deploying the nose gear wheel of the aircraft from the stowed position or during deploying the nose gear wheel of the aircraft from the stowed position, the process releases the stored energy to the nose gear wheel to rotate the nose gear wheel in the forward direction in preparation for landing (operation 1210). The nose gear spin down apparatus can release the stored energy to the nose gear wheel up until the point that the nose gear wheel and the nose gear spin down apparatus disengage.

In some alternative implementations of an illustrative example, the function or functions noted in the blocks may occur out of the order noted in the Figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
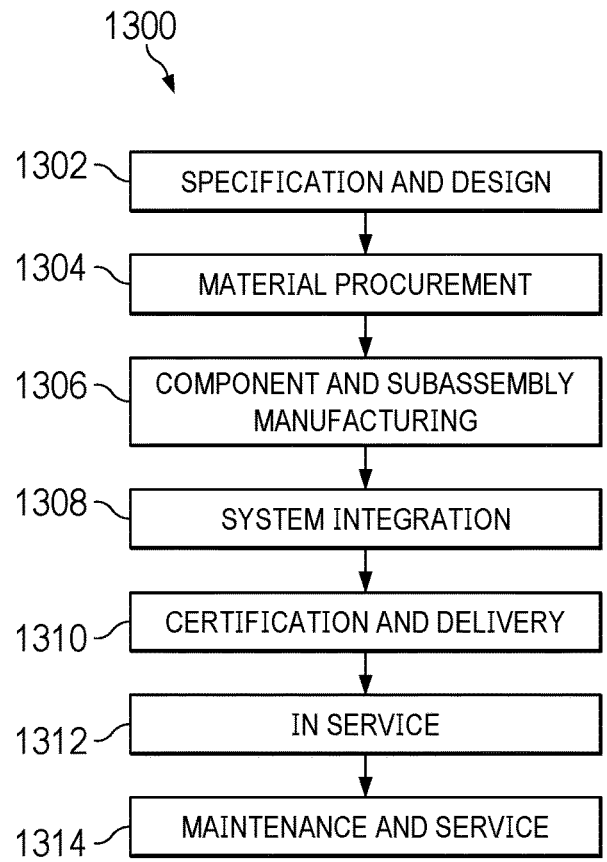
FIG. 13 is an illustration of a block diagram of an aircraft manufacturing and service method in accordance with an illustrative embodiment.
Figure 14:
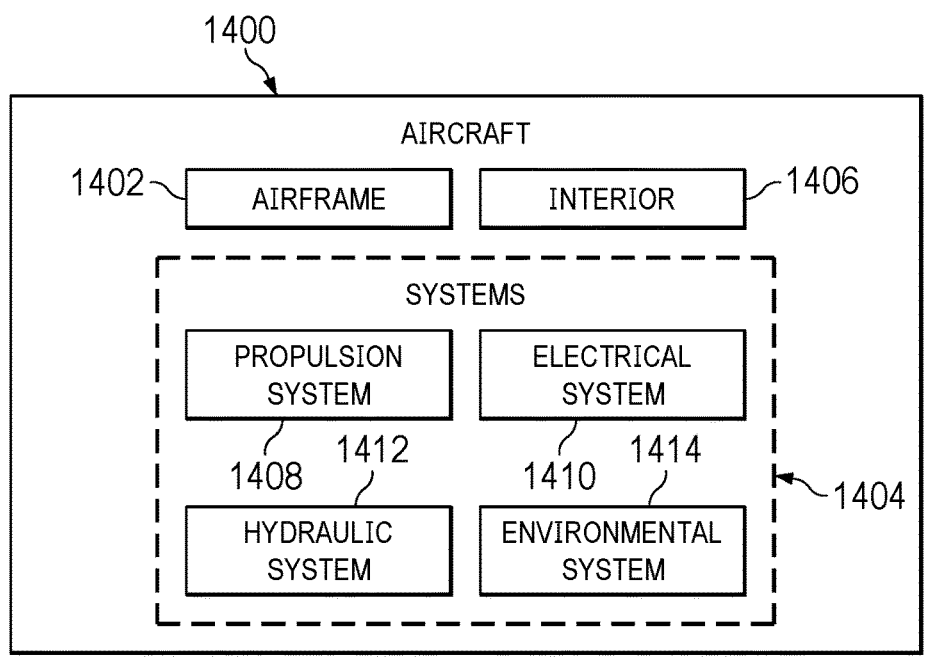
FIG. 14 is an illustration of a block diagram of an aircraft in which an illustrative embodiment may be implemented.

The illustrative embodiments of the disclosure may be further described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance, service, or inspection.

The apparatus of this disclosure may be installed on an aircraft during component and subassembly manufacturing 1306. In addition, the apparatus of this disclosure may be retrofitted onto aircraft 1400 in FIG. 14 during routine maintenance and service 1314 as part of a modification, reconfiguration, or refurbishment of aircraft 1400 in FIG. 14.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 14, an illustration of a block diagram of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314, inclusive of inspection, in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A nose gear spin down apparatus, comprising:
   a spin down device rotatable about a central longitudinal axis, wherein the spin down device rotates about the central longitudinal axis at a first speed after engagement with a spinning nose gear wheel of an aircraft that spins at a second speed;
   the spin down device comprising:
      a tubular casing comprising internal threads; and
      a threaded shaft positioned within the tubular casing and comprising external threads engaged with the internal threads of the tubular casing; and
   a resistance device distanced from the spin down device by a space;
   wherein the resistance device imparts a resistance to the spin down device when movement of the threaded shaft relative to the tubular casing along the central longitudinal axis or movement of the tubular casing relative to the threaded shaft along the central longitudinal axis causes the threaded shaft or the tubular casing to move through the space and into contact with the resistance device.

2. The nose gear spin down apparatus of claim 1, wherein the resistance device provides no resistance to the spin down device until the spin down device moves through the space and contacts the resistance device.

3. The nose gear spin down apparatus of claim 1, wherein the resistance device is a spring.

4. The nose gear spin down apparatus of claim 1, wherein the resistance device is a series of axially aligned springs, wherein each spring of the series of axially aligned springs has a different stiffness.

5. The nose gear spin down apparatus of claim 1, wherein the resistance device is a viscous damper.

6. The nose gear spin down apparatus of claim 1, wherein the resistance of the resistance device applied to the spin down device progressively builds after the spin down device contacts the resistance device.

7. The nose gear spin down apparatus of claim 1, further comprising a locking mechanism engaged with the resistance device to prevent release of an energy captured by the resistance device during engagement of the spin down device with the spinning nose gear wheel of the aircraft.

8. The nose gear spin down apparatus of claim 1, wherein the tubular casing comprises a machined or adhesive outer surface for engagement with the spinning nose gear wheel of the aircraft.

9. The nose gear spin down apparatus of claim 1, further comprising a wheel mounted to the tubular casing, the wheel for engagement with the spinning nose gear wheel of the aircraft.

10. The nose gear spin down apparatus of claim 1, wherein the tubular casing rotates relative to the threaded shaft.

11. The nose gear spin down apparatus of claim 1, wherein the threaded shaft rotates relative to the tubular casing.

12. The nose gear spin down apparatus of claim 1, further comprising:
   a wheel mounted to an axle;
   a first gear set mounted on the axle, the first gear set comprising a forward gear fixed to a reverse gear, wherein the first gear set is slidable longitudinally along the axle between a forward position and a reverse position; and
   a second gear set mounted on the threaded shaft;
   wherein when the first gear set is in the forward position, the forward gear of the first gear set engages the second gear set and wherein when the first gear set is in the reverse position, the reverse gear of the first gear set engages an idler gear and the idler gear engages the second gear set.

13. A nose gear spin down apparatus, comprising:
   a tubular casing comprising internal threads;
   a threaded shaft positioned within the tubular casing and comprising external threads engaged with the internal threads of the tubular casing; and
   a resistance device axially aligned with the threaded shaft, wherein the tubular casing and the threaded shaft and the resistance device share a central longitudinal axis;
   wherein movement of the threaded shaft relative to the tubular casing along the central longitudinal axis or movement of the tubular casing relative to the threaded shaft along the central longitudinal axis engages the resistance device after the threaded shaft or the tubular casing moves through a space;
   wherein the tubular casing rotates relative to the threaded shaft or the threaded shaft rotates relative to the tubular casing.

14. The nose gear spin down apparatus of claim 13, further comprising:
   a wheel mounted to an axle;
   a first gear set mounted on the axle, the first gear set comprising a forward gear fixed to a reverse gear, wherein the first gear set is slidable longitudinally along the axle between a forward position and a reverse position; and
   a second gear set mounted on the threaded shaft;
   wherein when the first gear set is in the forward position, the forward gear of the first gear set engages the second gear set and wherein when the first gear set is in the reverse position, the reverse gear of the first gear set engages an idler gear and the idler gear engages the second gear set.

15. The nose gear spin down apparatus of claim 13, wherein the resistance device provides no resistance to the threaded shaft or the tubular casing until the threaded shaft or the tubular casing moves through the space and contacts the resistance device.

16. The nose gear spin down apparatus of claim 13, wherein the resistance device is a spring.

17. The nose gear spin down apparatus of claim 13, wherein a resistance of the resistance device applied to the threaded shaft or the tubular casing progressively builds after the threaded shaft or the tubular casing contacts the resistance device.

18. A method for slowing rotation of a nose gear wheel of an aircraft after takeoff, the method comprising:
   retracting a spinning nose gear wheel of the aircraft to a stowed position in a nose gear bay of the aircraft after takeoff of the aircraft;

engaging the spinning nose gear wheel of the aircraft with a nose gear spin down apparatus mounted in the nose gear bay of the aircraft without imparting a resistance to the spinning nose gear wheel of the aircraft; and imparting the resistance to the spinning nose gear wheel of the aircraft with a resistance device of the nose gear spin down apparatus after an element of the nose gear spin down apparatus moves through a space between the element of the nose gear spin down apparatus and the resistance device and into contact with the resistance device.

19. The method of claim 18, further comprising:

storing energy from the spinning nose gear wheel of the aircraft as the nose gear spin down apparatus imparts the resistance to the spinning nose gear wheel of the aircraft and slows rotation of a forward direction of the spinning nose gear wheel of the aircraft after takeoff; and prior to deploying the spinning nose gear wheel of the aircraft from the stowed position, releasing the energy to the spinning nose gear wheel of the aircraft to rotate the spinning nose gear wheel of the aircraft in the forward direction.

20. The method of claim 18, wherein the element of the nose gear spin down apparatus is a threaded shaft, the nose gear spin down apparatus further comprises:

a tubular casing comprising internal threads, wherein engagement of the spinning nose gear wheel of the aircraft with the tubular casing causes rotation of the tubular casing about a central longitudinal axis of the tubular casing;

the threaded shaft is positioned within the tubular casing and is engaged with the internal threads of the tubular casing, wherein rotation of the tubular casing causes lateral movement of an end of the threaded shaft through the space; and the resistance device is axially aligned with the threaded shaft, wherein rotation of the tubular casing about the central longitudinal axis urges the end of the threaded shaft to move laterally with respect to the tubular casing along the central longitudinal axis through the space to contact the resistance device, wherein the resistance device provides the resistance to the lateral movement of the threaded shaft which translates the resistance to the rotation of the tubular casing.

* * * * *